United States Patent Office 3,110,480
Patented Nov. 12, 1963

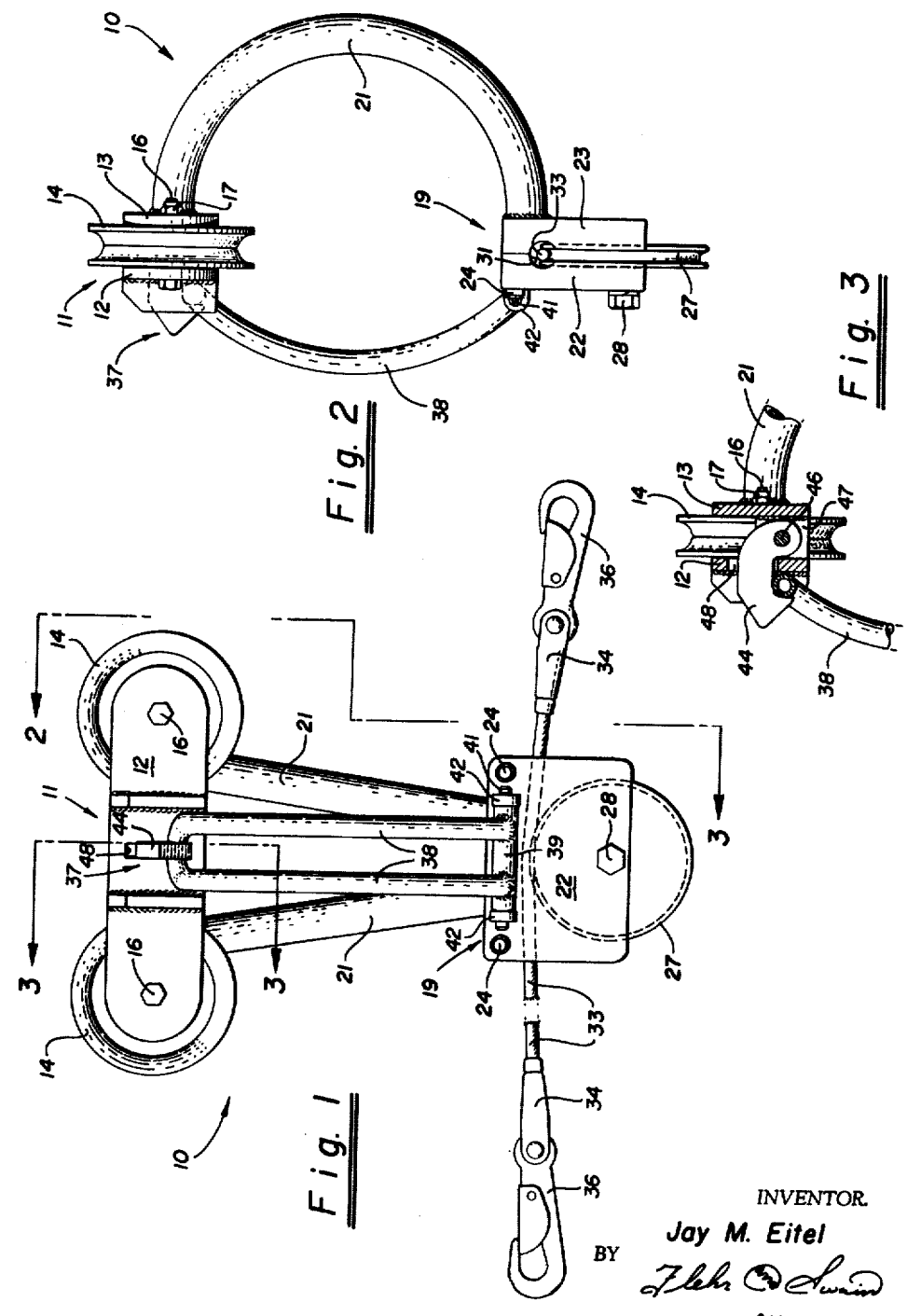

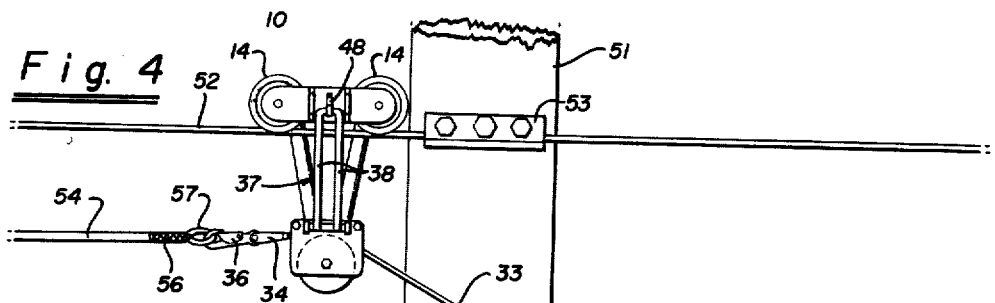
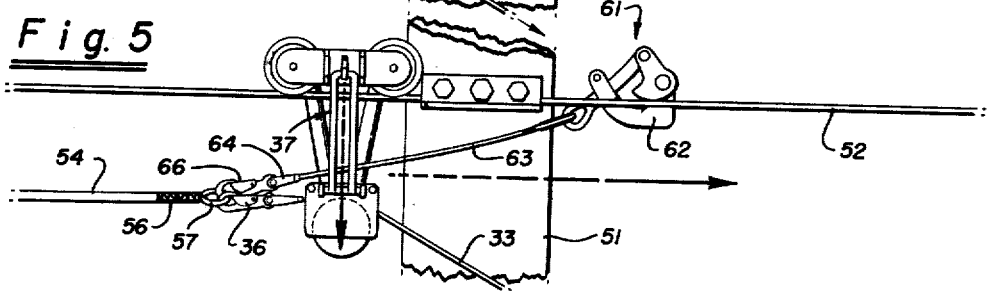
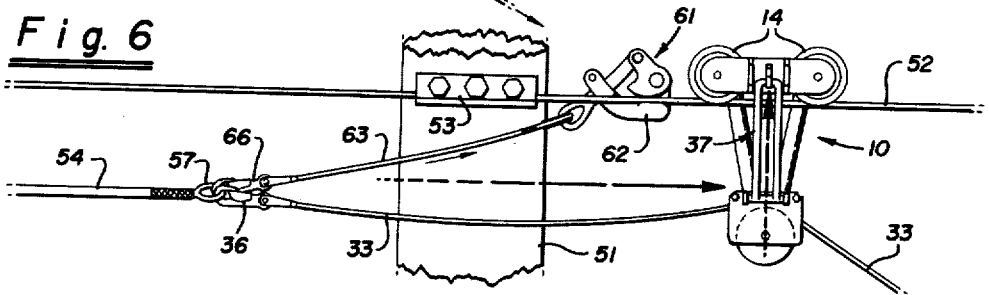
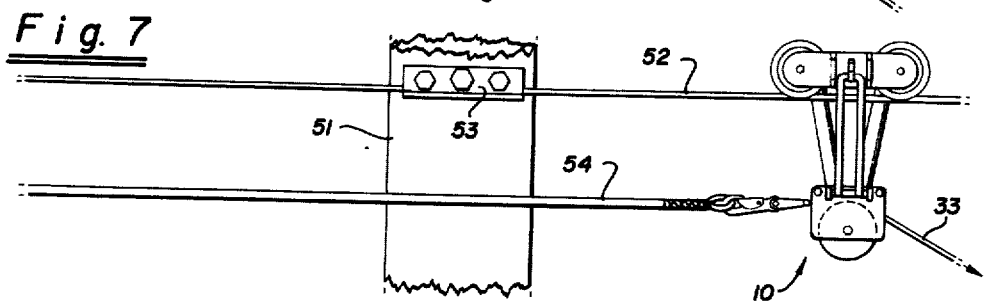

3,110,480
CABLE TOW DOLLY AND METHOD
Jay M. Eitel, Los Altos, Calif., assignor to Telsta Corp., San Carlos, Calif., a corporation of California
Filed Jan. 15, 1962, Ser. No. 166,247
13 Claims. (Cl. 254—134.3)

This invention relates to a cable tow dolly and method and more particularly to a cable tow dolly and method for towing cable past obstructions.

At the present time, considerable difficulties are encountered when it is attempted to pull cable past the poles to which the messenger or strand upon which the cable is to be secured is fastened. Also, there are similar difficulties in pulling cable through trees and other similar obstructions. There is, therefore, a need for a new and improved apparatus and method for pulling the cable around such obstructions.

In general, it is an object of the present invention to provide a cable tow dolly and method which makes it possible to readily tow the cable around or past obstructions.

Another object of the invention is to provide a cable tow dolly and method of the above character which is applicable to all sizes of cable.

Another object of the invention is to provide a cable tow dolly and method of the above character by which the cable tow dolly can be transferred around the obstruction with very little difficulty.

Another object of the invention is to provide a cable tow dolly and method of the above character in which the transfer of the dolly around the obstruction can be accomplished by one person.

Another object of the invention is to provide a cable tow dolly and method of the above character in which it is unnecessary to lift the cable or to lift the dolly against the tension on the cable when the dolly is transferred around the obstruction.

Another object of the invention is to provide a cable tow dolly and method of the above character which is particularly adaptable for use with equipment of the type in which a workman is carried on the outer end of a movable boom structure.

Another object of the invention is to provide a cable tow dolly of the above character which is constructed in such a manner that it can be utilized on messenger or strand on which cable has already been lashed or supported in rings.

Another object of the invention is to provide a cable tow dolly of the above character which can be readily placed on and removed from the messenger or strand.

Another object of the invention is to provide a cable tow dolly of the above character which readily travels along the messenger or strand.

Another object of the invention is to provide a cable tow dolly of the above character which is relatively simple and economical to construct.

Additional objects and features of the invention will appear from the following description in which the preferred embodiment is set forth in detail in conjunction with the accompanying drawings.

Referring to the drawings:

FIGURE 1 is a front elevational view of a cable tow dolly incorporating my invention.

FIGURE 2 is a side elevational view looking along the line 2—2 of FIGURE 1.

FIGURE 3 is a cross-sectional view taken along the line 3—3 of FIGURE 1.

FIGURES 4, 5, 6 and 7 illustrate the use of my cable tow dolly in performing my method.

In general, my cable tow dolly is adapted to be mounted on a strand or messenger supported by a plurality of poles. It is used for towing an elongate flexible member such as cable along the strand or messenger. The cable tow dolly consists of an upper wheeled framework which is adapted to travel upon the strand or messenger. A pulley housing with the pulley rotatably mounted therein is supported beneath the wheeled framework and has slidably mounted therein an elongate tow member. One end of the tow member is adapted to be connected to the cable, whereas the other end of the tow member is adapted to be towed. The tow member is provided with stop means which engages the dolly so that as the cable is pulled, the dolly will be pulled with the cable. When an obstruction is reached, additional means is provided for securing the cable to the messenger. Thereafter, the tension of the cable is released and the dolly is lifted off of the messenger and around the obstruction by sliding the dolly on the tow member and then placing the dolly upon the strand or messenger. The cable is then again placed under tension and the means for securing the cable to the messenger or strand is released. Thereafter, towing of the cable again continues, towing with it the cable tow dolly. This continues until the next obstruction is reached after which the same procedure is repeated.

As can be seen from FIGURES 1, 2 and 3 of the drawings, my cable tow dolly 10 consists of a wheeled framework 11. The wheeled framework is comprised of a pair of spaced parallel side plates 12 and 13 between which, on opposite ends thereof, are mounted a pair of rollers 14. The rollers 14 are rotatably mounted between the side plates upon suitable means such as the cap screws 16 extending through the side plates and the rollers. Nuts 17 are provided for securing the cap screws in place. If desired, bushings (not shown) can be provided on the cap screws to support the rollers 14. The rollers 14 are formed in such a manner that they are particularly adapted to travel upon messenger or strand. However, if desired, it is readily apparent that the rollers can be formed to travel on other types of elongate elements.

A pulley housing 19 immediately underlies the rollers 14 and is supported on the framework 11 by suitable means such as the pair of spaced downwardly depending members 21. The members 21 can take any desired configuration. However, as hereinafter explained and in my copending application Serial No. 166,035, filed January 15, 1962, it is desirable that there be considerable clearance provided below the rollers 14 so that the cable tow dolly can be used on messenger to which one or more cables have already been lashed. Thus, to make this possible, the depending members 21 have a substantially semicircular shape as shown. The upper ends of the members 21 are secured to the side plate 13 by suitable means such as welding.

The pulley housing 19 consists of a pair of side members 22 and 23. The member 23 is secured to the depending members 21 by suitable means such as welding. The member 22 is affixed to the other member 23 by cap screws 24. A pulley 27 is rotatably mounted between the members 22 and 23 and is supported by a cap screw 28 which extends through the side member 22 and the pulley 27 and is threaded into the member 23. Again, if desired, a suitable bushing (not shown) may be provided on the cap screw 28.

It will be noted that the members 22 and 23 are formed in such a manner so that when they are fastened together by the cap screws 24, they provide a relatively small hole or opening 31 which is circular in shape and in which the lower one-half is formed by the pulley 27 and the upper one-half is formed by the plates 22 and 23. It also will be noted that the plates 22 and 23 are provided with chamfered surfaces 32 about the hole 31 for a purpose hereinafter described.

An elongate tow member 33 of a suitable flexible material such as wire rope is slidably mounted in the hole 31 and has a length which is substantially greater than the width of the tow dolly as, for example, a length of five feet, for a purpose hereinafter described. A clevis end 34 is affixed to each end of the tow member 33. A snap 36 is pivotally mounted on each of the clevis ends 34 as shown.

Gate or door means 37 is provided to prevent the cable tow dolly from accidentally jumping off of the messenger or strand. It consists of a U-shaped member 38 which has its lower ends fixed to a sleeve 39 which is rotatably mounted upon a hinge pin 41 carried by ears 42 provided on the side plate 22.

The gate means is movable between open and closed position and is retained in a closed position by a gravity operated latch 44 which is pivotally mounted upon a pin 46 affixed to a pair of cross members 47 provided between the plates 12 and 13. The latch extends through a slot 48 provided in the side plate 12 and is movable into and out of engagement with the upper end of the U-shaped member 38. If desired, a spring (not shown) may be used in addition to retain the latch 44 in a closed position.

Operation and use of my cable tow dolly in performing my method may now be briefly described in conjunction with FIGURES 4, 5, 6 and 7 of the drawings. As shown in the drawings, let it be assumed that it is desired to string a cable along a pole line which consists of a plurality of poles 51 and upon which a messenger or strand 52 has already been mounted by clamps 53. The cable tow dolly is first mounted upon the tensioned strand by opening the gate means 37 and then placing the rollers 14 over the strand and closing the gate to lock the cable tow dolly upon the messenger or strand by permitting the latch 48 to engage the U-shaped member 38 as shown in FIGURE 3. The end of the cable 54 is then secured to one end of the tow member carried by the cable tow dolly in a suitable manner such as the connector 56 which is provided with a ring 57 which can be snapped onto the snap 36 as shown in FIGURE 4 of the drawings. The connector 56 is of a conventional type and is provided with a basket-weave so that the harder the pull, the tighter the connector grips the cable.

The other end of the tow member 33 is connected to suitable pulling means and the cable is pulled along the messenger by pulling on the tow member 33. As the cable is pulled, the dolly 10 is pulled along with it because the clevis end 34 comes into engagement with the pulley housing and since it is of a size that cannot pass through the opening 31, the dolly is pulled aloIng with the cable. Thus, the dolly serves to support the end of the cable and to pull the cable in a position adjacent and parallel to the messenger.

When the dolly arrives at an obstruction such as a pole 51 as shown in FIGURE 4 of the drawings, additional means 61 is provided for securing the cable 54 to the messenger and consists of a strand grip or clamp 62 sometimes referred to as a "come-along" which is of a conventional construction secured to the messenger or strand 52. A piece of rope or cable 63 has one end secured to the clamp 62 and its other end provided with a clevis end 64 and a snap 66 so that it can be connected into the ring 57 provided on the conductor 56. After this additional securing means has been attached as shown in FIGURE 5, the tension on the cable tow member 33 can be released so that the additional means 61 retains the cable.

After the tension on the cable tow member 33 has been released, the cable tow dolly 10 can be readily lifted around the pole 51 by first opening the gate means 37 by raising the latch 48, lifting the cable tow dolly from the messenger or strand, lifting it around the pole by sliding it on the cable tow member 33, placing the rollers 14 on the messenger or strand on the other side of the clamp 62 and then again latching the gate means. During this transfer of the cable tow dolly 10, it is only necessary to lift the weight of the cable tow dolly because the tension on the cable is being maintained by the additional securing means 61. Since there is no pulling force being applied to the cable tow member 33, the cable tow dolly can be readily lifted around the pole by one man.

After the cable tow dolly 10 has been placed on the other side of the pole, tension is again placed on the cable tow line 33, after which the additional securing means 61 is unfastened from the cable. Thereafter, the cable can again be towed in the manner hereinbefore described to carry with it the dolly as shown in FIGURE 7. This can continue until the next obstacle is reached, after which the same procedure is repeated.

Although the drawings show the cable being towed in only one direction, it is readily apparent from the construction of the cable tow dolly that the cable tow dolly can be utilized for towing cable in either direction because the clevis ends 34 serve as stops to carry the cable tow dolly in either direction when the cable is being pulled or towed. It is also apparent that the cable tow dolly can be used for either roadside placement or fieldside placement of cable without any difficulty.

As explained in my copending application Serial No. 166,035, filed January 15, 1962, the cable tow dolly is particularly useful in the stringing of additional cables where one or more cables are already lashed in place on a single messenger or strand.

It is apparent from the foregoing that I have provided a new and improved apparatus and method for towing cable around obstructions. Although the method has been described primarily in conjunction with the poles supporting the messenger or strand, it is readily apparent that the method would be the same in passing such objects such as trees. By my method, it is possible to progress around a large limb or a number of limbs just by one removal and replacement of the cable tow dolly.

I claim:

1. In a dolly adapted to be mounted on a strand or messenger supported by a plurality of poles for towing an elongate flexible member such as cable, a framework, means mounted on the framework and adapted to travel upon the strand or messenger, a tow member slidably mounted in said framework and having a length substantially greater than the width of the framework, means secured to one end of the tow member adapted to be connected to the cable, the other end of the tow member being adapted to be pulled, and stop means carried by the tow member and adapted to engage the framework so that as the tow member is towed to pull the cable, the dolly is pulled with the tow member when the stop means engages the framework.

2. A dolly as in claim 1 wherein said framework is provided with an opening through which the tow member slidably extends and wherein said stop means is larger than the opening so that it cannot pass through the opening.

3. In a dolly adapted to be mounted upon strand or messenger supported by a plurality of poles and for use for towing an elongate flexible member such as cable, a framework, wheel-like means mounted in the framework and adapted to travel upon the strand or messenger, a housing secured to the framework and generally underlying the wheel-like means, an elongate tow member slidably mounted in said housing and having a length substantially greater than the width of said framework, means secured to one end of said tow member and adapted to be connected to the cable, and stop means carried by the tow member, the other end of the tow member being adapted to be towed to pull the cable, said stop means engaging the housing as the tow member is pulled and serving to urge the dolly along the messenger.

4. A dolly as in claim 5 wherein the portion of said framework supporting the housing below the wheel-like means includes a depending member disposed on one side of the wheel-like means and the housing, and gate means movable between open and closed positions disposed on the other side of the wheel-like means and the housing.

5. In a dolly adapted to be mounted upon a strand or messenger supported by a plurality of poles and to be used for towing an elongate flexible member such as a cable, a framework, a pair of rollers rotatably mounted in said framework and adapted to travel upon the strand or messenger, a pulley housing, means for supporting the pulley housing from the framework so that the pulley housing generally underlies the rollers rotatably mounted in the framework, said supporting means being curved outwardly away from the rollers so as to provide substantial clearance immediately below the rollers, a pulley rotatably mounted in the pulley housing, the pulley and the pulley housing forming a hole, a flexible tow member slidably mounted in the hole, means connected to one end of the tow member and adapted to be connected to the cable, and stop means carried by the tow member and having a size greater than the size of the hole whereby as said tow member is towed to pull the cable, the stop means will engage the pulley housing and will cause the dolly to travel on the messenger as the cable is being towed.

6. A dolly as in claim 5 together with gate means mounted on the other side of the pulley housing and the framework said gate means being movable between open and closed positions, and latch means for retaining the gate means in a closed position.

7. A dolly as in claim 6 wherein separate stop means is provided on the tow member on opposite sides of the dolly so that the dolly can be towed in either direction.

8. A dolly as in claim 7 wherein said gate means also extends outwardly from the framework to provide clearance immediately below the strand upon which the pulleys ride.

9. A dolly as in claim 6 wherein the means supporting the pulley housing and the gate means are both substantially semi-circular.

10. In a method for towing an elongate flexible element such as cable around an obstruction utilizing a cable tow dolly having a framework adapted to travel upon the messenger or strand and carrying an elongate tow member slidably mounted therein, the method comprising the steps of attaching one end of the elongate tow member to the cable, towing the other end of the tow member to pull the cable and the cable tow dolly until an obstruction is reached, releasably securing the end of the cable connected to the tow member to the messenger, releasing the tension on the tow member, lifting the cable tow dolly from the messenger, transferring the cable tow dolly around the obstacle while sliding it on the tow member, placing the cable tow dolly on the messenger, applying tension to the tow member carried by the tow dolly, releasing the cable from the messenger, and again towing the cable and the cable tow dolly by towing the tow member.

11. In a method for towing an elongate element such as a cable around an obstruction by utilizing a cable tow dolly travelling upon a messenger or strand, towing the cable with the cable tow dolly to the obstruction, securing the cable to the messenger or strand, lifting the cable tow dolly around the pole and placing the same upon the messenger or strand, placing tension on the cable tow dolly and cable, releasing the cable from the messenger or strand, and again towing the cable with the cable tow dolly.

12. In a dolly adapted to be mounted on a strand or messenger supported by a plurality of poles for towing an elongate flexible member such as a cable, a framework, wheel-like means mounted on the framework and adapted to travel upon the strand or messenger, a pulley housing mounted on the framework and underlying the wheel-like means, a pulley rotatably mounted in the pulley housing, the pulley and the pulley housing forming an opening, a tow member extending through and being slidably mounted in the opening, means secured on one end of the tow member and adapted to be connected to the cable, the other end of the tow member being adapted to be pulled, and stop means carried by the tow member and having a size larger than the size of the opening so that it cannot pass through the opening whereby as the tow member is towed to pull the cable, the dolly is pulled with the tow member when the stop means engages the pulley and the pulley housing.

13. In a dolly adapted to be mounted on a strand or messenger supported by a plurality of poles and to be used for towing an elongate flexible member such as a cable, a framework, means carried by the framework so that the framework is adapted to travel upon the strand or messenger, a housing mounted on said framework and generally underlying the means adapted to travel upon the strand or messenger, the housing having an opening therein, a flexible tow member slidably mounted in the opening, means secured to one end of the tow member adapted to be connected to the cable, and stop means carried by the tow member and having a size greater than the size of the opening whereby as the tow member is towed to pull the cable, the stop means engages the housing and causes the dolly to travel on the messenger as the cable is being towed.

References Cited in the file of this patent
UNITED STATES PATENTS
2,983,037    Hendrix _____ May 9, 1961

UNITED STATES PATENT OFFICE
CERTIFICATE OF CORRECTION

Patent No. 3,110,480                                  November 12, 1963

Jay M. Eitel

It is hereby certified that error appears in the above numbered patent requiring correction and that the said Letters Patent should read as corrected below.

Column 4, line 75, for the claim reference numeral "5" read -- 3 --.

Signed and sealed this 7th day of December 1965.

(SEAL)
Attest:

ERNEST W. SWIDER                                      EDWARD J. BRENNER
Attesting Officer                                           Commissioner of Patents